United States Patent
Bae et al.

(10) Patent No.: US 7,799,307 B2
(45) Date of Patent: Sep. 21, 2010

(54) METHOD OF GROWING SINGLE-WALLED CARBON NANOTUBES

(75) Inventors: Eun-Ju Bae, Yongin-si (KR); Yo-Sep Min, Yeongin-si (KR); Wan-Jun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 946 days.

(21) Appl. No.: 11/393,658

(22) Filed: Mar. 31, 2006

(65) Prior Publication Data

US 2007/0014714 A1    Jan. 18, 2007

(30) Foreign Application Priority Data

Jul. 12, 2005    (KR) .................... 10-2005-0062931

(51) Int. Cl.
*D01F 9/12*   (2006.01)

(52) U.S. Cl. ............... 423/447.1; 423/445 B; 423/447.7; 977/845

(58) Field of Classification Search ... 423/447.1–447.9, 423/445 B; 977/842, 845
See application file for complete search history.

(56) References Cited

U.S. PATENT DOCUMENTS

| | | | |
|---|---|---|---|
| 2005/0089467 A1* | 4/2005 | Grill et al. | 423/447.3 |
| 2005/0214197 A1* | 9/2005 | Gu et al. | 423/447.3 |
| 2006/0233692 A1* | 10/2006 | Scaringe et al. | 423/447.3 |
| 2007/0116631 A1* | 5/2007 | Li et al. | 423/447.3 |
| 2007/0248528 A1* | 10/2007 | Kim | 423/447.1 |

FOREIGN PATENT DOCUMENTS

| | | |
|---|---|---|
| KR | 10-2002-0057636 | 7/2002 |
| KR | 10-2005-0052885 | 6/2005 |

OTHER PUBLICATIONS

Min et al, Low-Temperature Growth of Single-Walled Carbon Nanotubes by Water Plasma Chemical Vapor Deposition, Aug. 19, 2005, Journal of American Chemical Society, vol. 127, 12498-12499.*
Li et al., "Preferential Growth of Semicondcuting Single-Walled Carbon Nanotubes by a Plasma Enhanced CVD Method.".. J. Amer Chem Society; Nanoletters. 2004. 4 (2). 317-321.*
Hata et al. "Water-Assisted Hihgly Efficient Synthesis of Impuriyt-Free Single-Walled carbon nanotubes". Science 2004; 306. 1362-1364.*
Oriented Long Single Walled Carbon Nanotubes on Substrates from Floating Catalysts Shaoming Huang,, Xianyu Cai,, Chunsheng Du, and, Jie Liu The Journal of Physical Chemistry B 2003 107 (48), 13251-13254.*

* cited by examiner

*Primary Examiner*—Stuart Hendrickson
*Assistant Examiner*—Richard M Rump
(74) *Attorney, Agent, or Firm*—Harness, Dickey & Pierce, P.L.C.

(57) ABSTRACT

A method of growing single-walled carbon nanotubes. The method may include supplying at least one of an oxidant and an etchant into a vacuum chamber and supplying a source gas into the vacuum chamber to grow carbon nanotubes on a substrate in an oxidant or an etchant atmosphere. The carbon nanotubes may be grown in an $H_2O$ plasma atmosphere. The carbon nanotubes may be grown at a temperature less than 500° C.

8 Claims, 3 Drawing Sheets

METHOD OF GROWING SINGLE-WALLED CARBON NANOTUBES

PRIORITY STATEMENT

This application claims the benefit of Korean Patent Application No. 10-2005-0062931, filed on Jul. 12, 2005, in the Korean Intellectual Property Office, the disclosure of which incorporated herein in its entirety by reference.

BACKGROUND OF THE INVENTION

1. Field of the Invention

Example embodiments of the present invention relate to a method of growing carbon nanotubes, and more particularly, to a method of growing single-walled carbon nanotubes at a relatively low temperature using $H_2O$ plasma.

2. Description of the Related Art

Carbon nanotubes (CNTs) are a carbon allotrope which makes up a large amount of carbon existing on the earth. CNTs are materials in which one carbon is bonded to another carbon atom in a hexagonal honeycomb pattern and which forms a tube shape. The diameter of the tube may be on the order of several nanometers (nm=one billionth of a meter). CNTs may have excellent mechanical characteristics, electrical selectivity, excellent field emission characteristics, and/or high-efficiency hydrogen storage medium characteristics and are well-known as useful materials.

CNTs whose graphite sheet is rolled in a nano-sized diameter may have a sp2 bond structure. Such CNTs may exhibit the electrical characteristics of a conductor or a semiconductor depending on the rolled angle and/or shape of the graphite sheet. CNTs may be classified into single-walled nanotubes (SWNTs) or multi-walled nanotubes (MWNTs) according to the number of combinations that form their walls. Further, bundled nanotubes in which several SWNTs are combined with one another may be referred to as rope nanotubes.

CNTs may be manufactured using high synthesis technology. High synthesis technology may include arc-discharge, laser vaporization, plasma enhanced chemical vapor deposition, thermal chemical vapor deposition, electrolysis, and/or flame synthesis. CNTs may have high electrical characteristics and thus can be used to manufacture a semiconductor device, for example, a CMOS. In general, a process of manufacturing a semiconductor device, for example, a CMOS and an integration process should be performed at as low a temperature as possible, for example, less than 500° C. to reduce defects in the semiconductor device. However, if the CNTs are grown at a temperature less than 500° C. using a conventional CNT synthesis method, a large amount of impurity, for example, amorphous carbon may be generated and defective CNTs may be grown. Due to the defective CNTs, the characteristics and performance of the semiconductor device containing them may be degraded.

SUMMARY OF THE INVENTION

Example embodiments of the present invention provide a method of growing single-walled carbon nanotubes (CNTs) using an oxidant and/or an etchant.

Example embodiments of the present invention provide a method of growing single-walled carbon nanotubes (CNTs) using $H_2O$ plasma.

Example embodiments of the present invention provide a method of growing single-walled carbon nanotubes (CNTs) at a relatively low temperature.

Example embodiments of the present invention provide a method of growing single-walled carbon nanotubes (CNTs) at a relatively low temperature using $H_2O$ plasma.

Example embodiments of the present invention provide a method of growing single-walled carbon nanotubes (CNTs) at a temperature of less than 500° C.

According to an example embodiment of the present invention, there is provided a method of growing single-walled carbon nanotubes, the method including preparing a vacuum chamber, preparing a substrate on which catalyst metal is deposited in the vacuum chamber, vaporizing $H_2O$ to be supplied into the vacuum chamber; generating $H_2O$ plasma discharge in the vacuum chamber, and supplying a source gas into the vacuum chamber to grow carbon nanotubes on the substrate in an $H_2O$ plasma atmosphere.

According to an example embodiment of the present invention, there is provided a method of growing single-walled carbon nanotubes, the method including supplying at least one of an oxidant and an etchant into a vacuum chamber; and supplying a source gas into the vacuum chamber to grow carbon nanotubes on a substrate in an oxidant or etchant atmosphere.

In an example embodiment, supplying at least one of the oxidant and the etchant includes generating $H_2O$ plasma discharge.

In an example embodiment, the power of the $H_2O$ plasma may be controlled to be less than 80 W. In an example embodiment, the carbon nanotubes may be grown at a temperature less than 500° C. for 10 to 600 seconds.

In an example embodiment, the catalyst metal may be at least one selected from the group consisting of Fe, Ni, and Co.

In an example embodiment, the source gas may be at least one selected from the group consisting of $C_2H_2$, $CH_4$, $C_2H_4$, $C_2H_6$, and CO and may be supplied at a flux of 20 to 60 sccm.

In an example embodiment, the substrate may be made of Si, $SiO_2$, or glass.

According to an example embodiment of the present invention, there is provided a method of growing single-walled carbon nanotubes, including generating $H_2O$ plasma discharge in a vacuum chamber and supplying a source gas into the vacuum chamber to grow carbon nanotubes on a substrate in an $H_2O$ plasma atmosphere.

BRIEF DESCRIPTION OF THE DRAWINGS

The above and other aspects of example embodiments of the present invention will become more apparent by describing in detail exemplary embodiments thereof with reference to the attached drawings in which.

DETAILED DESCRIPTION OF EXAMPLE EMBODIMENTS OF THE INVENTION

Figure 1:
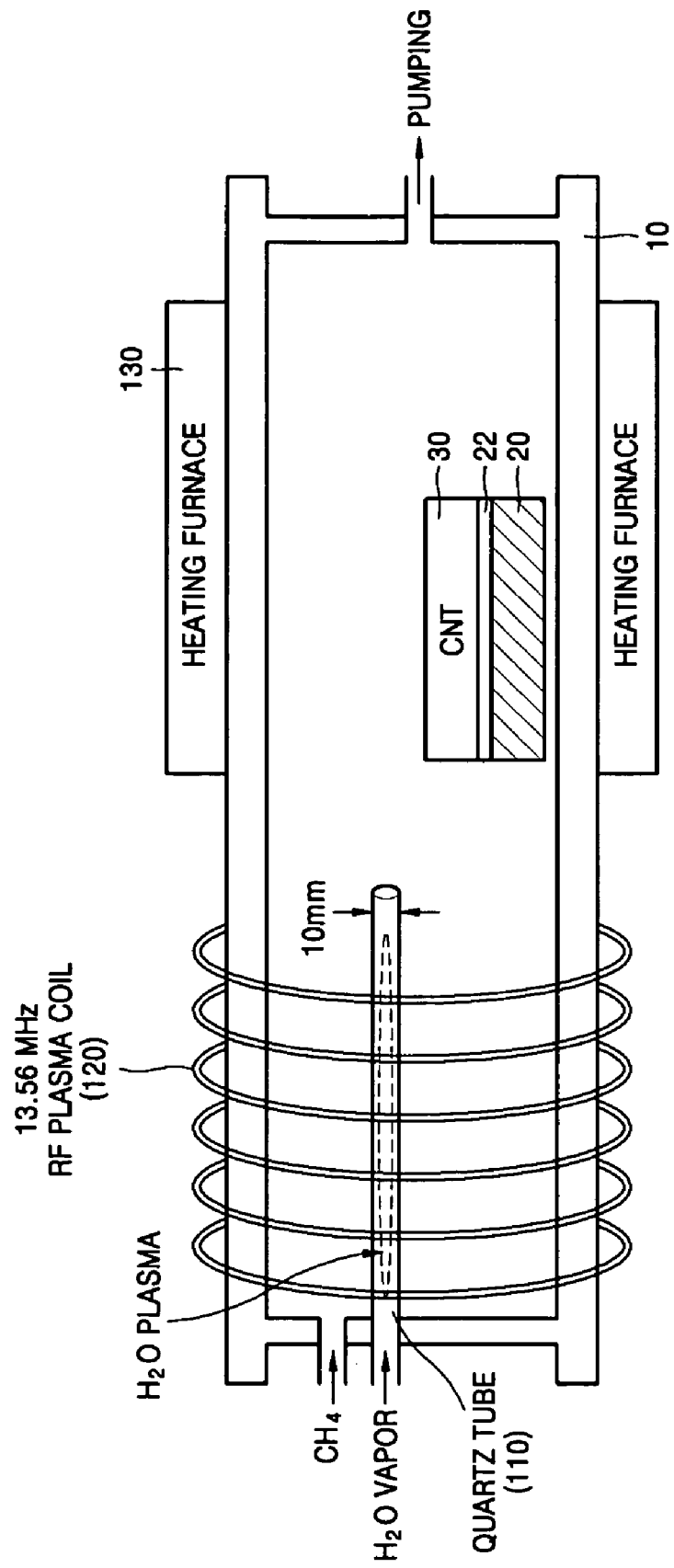
FIG. 1 is a view of an apparatus used in a method of growing single-walled nanotubes (SWNTs) according to an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numbers refer to like elements throughout the figures. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes", "comprises", "including" and/or "comprising", when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of example embodiments (and intermediate structures) of the present invention. As such, variations from the shapes of the illustrations as a result, of manufacturing techniques and/or tolerances, for example, are to be expected. Thus, example embodiments of the present invention should not be construed as limited to the particular shapes of regions illustrated herein and are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation, for example, may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view of an apparatus used in a method of growing single-walled nanotubes (SWNTs) at a relatively low temperature according to an example embodiment of the present invention. In general, power used to generate discharge in plasma chemical vapor deposition (CVD) equipment may be classified into two types: direct current (DC) or high-frequency power. Radio frequency (RF) of 13.56 MHz and microwaves of 2.47 GHz are usually used as high-frequency power. In a plasma CVD method, glow discharge may be generated in a vacuum chamber using high-frequency power applied to a positive electrode. The principle and apparatus of plasma CVD are well-known to those skilled in the art and thus, a detailed description thereof will be omitted.

A remote plasma enhanced chemical vapor deposition (PE CVD) apparatus in which a heating zone and a plasma zone are separated from each other is shown in FIG. 1. An RF plasma coil 120 for generating plasma may be located at one end of a vacuum chamber 10 and a heating furnace 130 for heating the vacuum chamber 10 at a desired temperature may be located at the other end of the vacuum chamber 10. A slim and/or long-shaped quartz tube 110 having a diameter of 10 mm may be located in the vacuum chamber 10. The quartz tube 110 may be placed within the RF plasma coil 120, that is, in a plasma zone.

A substrate 20 on which catalyst metal 22 may be deposited is inserted in the vacuum chamber 10. The vacuum chamber 10 may be made of quartz. The substrate 20 may be a substrate made of Si, $SiO_2$, or glass. The catalyst metal 22 may be Fe, Ni, or Co. The catalyst metal 22 may be deposited on the substrate 22 made of Si, $SiO_2$, or glass using thermal deposition, sputtering, or spin coating.

$H_2O$ may be vaporized and supplied into the vacuum chamber 10, that is, into the quartz tube 110, and the vacuum chamber 10 may be gradually heated and kept at a temperature less than 500° C. RF power may be applied to the RF plasma coil 120 so that $H_2O$ plasma discharge is generated in the vacuum chamber 10, that is, in the quartz tube 110. The power of $H_2O$ plasma may be controlled to be less than 80 W. A source gas may be supplied into the vacuum chamber 10 so that carbon nanotubes (CNTs) 30 are grown on the substrate 10 in a $H_2O$ plasma atmosphere. In general, a source gas, for example, $C_2H_2$, $CH_4$, $C_2H_4$, $C_2H_6$, and/or CO may be used to synthesize the CNTs 30. The source gas may be supplied at a flux of 20-60 sccm. The growth of the CNTs 30 may be performed for 10-600 seconds.

In example embodiments of the present invention, CNTs 30 are grown using CVD in an $H_2O$ plasma atmosphere. The $H_2O$ plasma may act as an oxidant, for example, an oxidant and/or an etchant, for example, a mild oxidant or etchant, when the CNTs 30 are grown so that carbonaceous impurities may be removed. For example, when the CNTs 30 are grown in an $H_2O$ plasma atmosphere, they may be grown at a relatively low temperature, for example, less than 500° C. Thus, the amount of impurity, such as amorphous carbon, generated when the CNTs 30 are grown using a conventional high temperature process more than 800° C. can be reduced. As a result, SWNTs having a smaller (or no) amount of carbonaceous impurity and/or disordered carbon may be obtained. For example, because the SWNTs are grown with a lower temperature process and the crystallinity thereof is higher, the SWNTs may be used to manufacture a semiconductor device.

Figure 2:
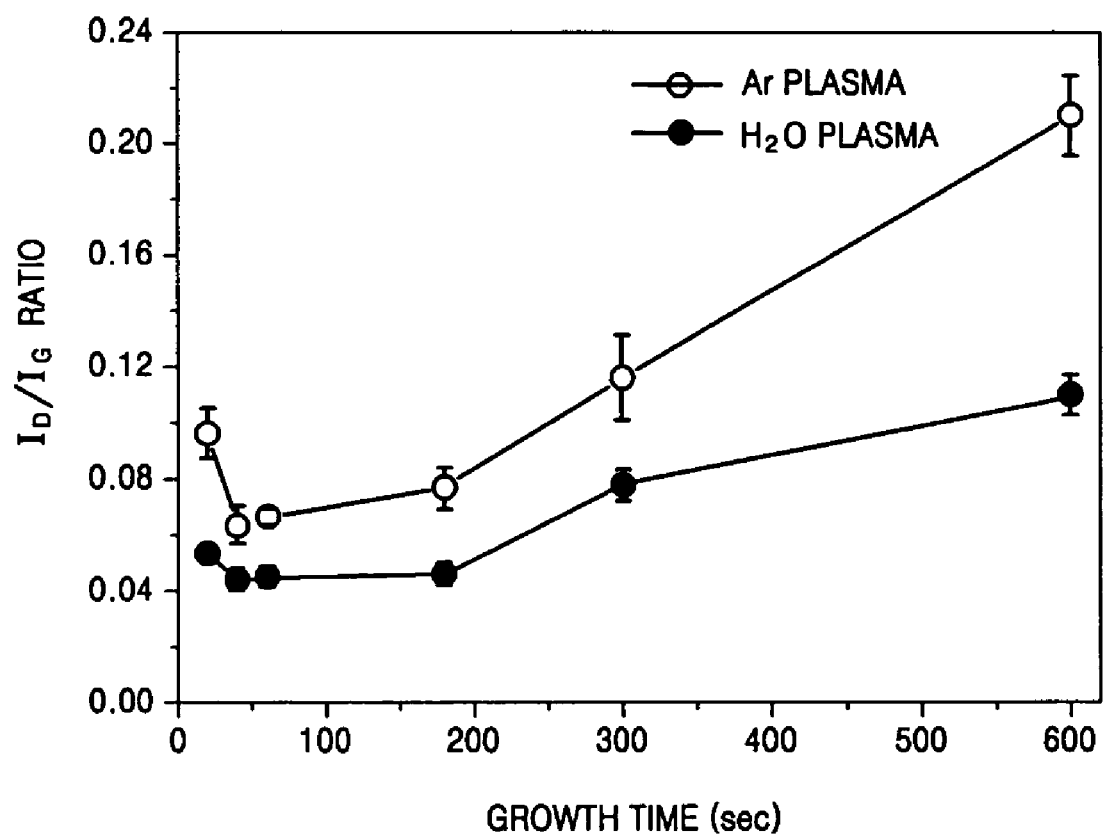
FIG. 2 is an example graph of the ratio $I_D/I_G$ of Raman intensity of D-band to G-band versus growth time when SWNTs are grown using $H_2O$ plasma.

FIG. 2 is a graph of the ratio ID/IG of Raman intensity of D-band to G-band versus growth time when SWNTs are grown using $H_2O$ plasma. A variation in ratio $I_D/I_G$ of Raman intensity of D-band to G-band versus growth time when SWNTs are grown using Ar plasma is also shown in FIG. 2

Figure 3A:
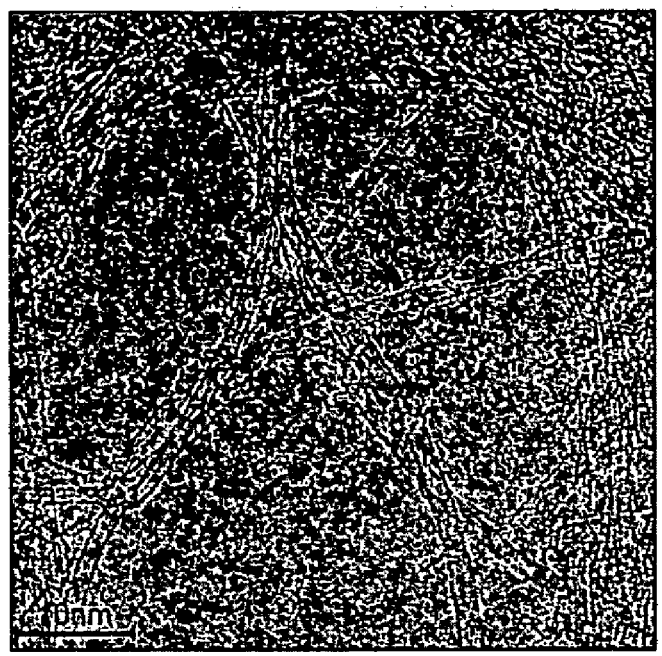
FIGS. 3A and 3B are example TEM photos of SWNTs grown using $H_2O$ plasma and SWNTs grown using Ar plasma, respectively.
Figure 3B:
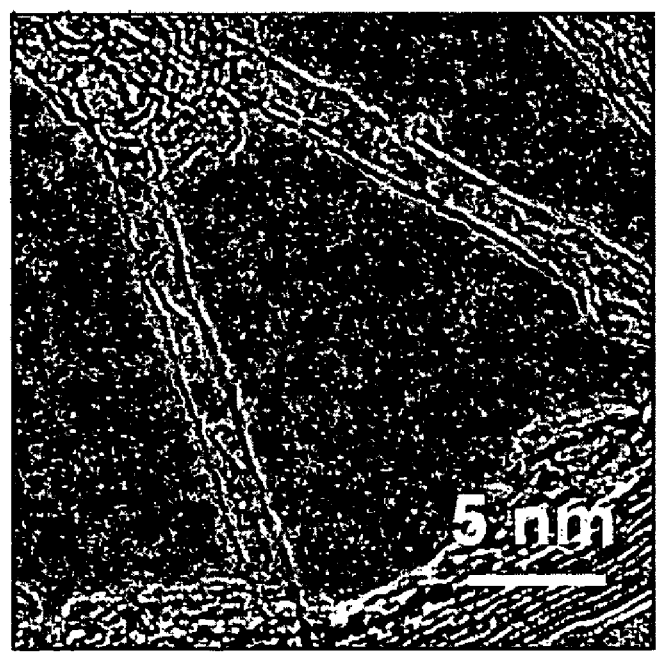

FIGS. 3A and 3B are TEM photos of example SWNTs grown using $H_2O$ plasma and SWNTs grown using Ar plasma, respectively. As described above, according to example embodiments of the present invention, single-walled carbon nanotubes may be grown at a relatively low temperature, for example, less than 500° C. In an example embodiment, most of the carbon nanotubes may be grown as single-walled carbon nanotubes (SWNTs) and do not include many (if any) multi-walled carbon nanotubes (MWNTs).

For example, the SWNTs include a relatively small amount of carbonaceous impurity and/or have higher crystallinity such that they may be used to manufacture a semiconductor device.

Although example embodiments of the present application are discussed in the context of $H_2O$ plasma, any oxidant and/or etchant know to one of ordinary skill in the art may also be used.

While the present invention has been particularly shown and described with reference to example embodiments thereof, it will be understood by those skilled in the art that various changes in form and details may be made therein without departing from the spirit and scope of the invention as defined by the following claims.

What is claimed is:

1. A method of growing single-walled carbon nanotubes, comprising:
   preparing a vacuum chamber;
   preparing a substrate on which at least one catalyst metal is deposited in the vacuum chamber;
   vaporizing H2O to be supplied into the vacuum chamber;
   generating H2O plasma discharge in the vacuum chamber; and
   supplying a source gas into the vacuum chamber to grow carbon nanotubes on the substrate in an H2O plasma atmosphere.

2. The method of claim 1, wherein the H2O plasma is generated at a power less than 80 W.

3. The method of claim 1, wherein the carbon nanotubes are grown at a temperature less than 500° C.

4. The method of claim 1, wherein the carbon nanotubes are grown for 10 to 600 seconds.

5. The method of claim 1, wherein the catalyst metal is at least one selected from the group consisting of Fe, Ni, and Co.

6. The method of claim 1, wherein the source gas is at least one selected from the group consisting of C2H2, CH4, C2H4, C2H6, and CO.

7. The method of claim 6, wherein the source gas is supplied at a flux of 20 to 60 sccm.

8. The method of claim 1, wherein the substrate is made of Si, SiO2, or glass.

* * * * *